United States Patent
Wang et al.

(10) Patent No.: US 12,033,109 B1
(45) Date of Patent: Jul. 9, 2024

(54) GENERATING A RANGE OF ESTIMATED FULFILLMENT TIMES FOR AN ORDER BASED ON CHARACTERISTICS OF AN ORDER

(71) Applicant: Maplebear Inc., San Francisco, CA (US)

(72) Inventors: Shuai Wang, Millburn, NJ (US); Zi Wang, Mountain View, CA (US); Liang Chen, Sunnyvale, CA (US); Houtao Deng, Sunnyvale, CA (US); Xiangyu Wang, San Jose, CA (US); Aman Jain, Barrie (CA); Jian Wang, Saratoga, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/114,858

(22) Filed: Feb. 27, 2023

(51) Int. Cl.
*G06Q 10/0835* (2023.01)
*G06Q 10/0833* (2023.01)

(52) U.S. Cl.
CPC ..... *G06Q 10/0835* (2013.01); *G06Q 10/0833* (2013.01)

(58) Field of Classification Search
USPC .......................................... 705/336
See application file for complete search history.

(56) References Cited

U.S. PATENT DOCUMENTS

2020/0160264 A1* 5/2020 Silverman ........ G06Q 10/08355
2020/0342398 A1* 10/2020 Aggarwal .......... G06Q 10/0838

FOREIGN PATENT DOCUMENTS

CN 115034860 * 9/2022 ............. G06Q 10/10

OTHER PUBLICATIONS

Qiu et al, Machine Learning based Short-Travel Time Prediction, Sustainability 13.13 7454 (Year: 2021).*

* cited by examiner

*Primary Examiner* — Jeff Zimmerman
*Assistant Examiner* — Mark C Clare
(74) *Attorney, Agent, or Firm* — Fenwick & West LLP (57) ABSTRACT

An online concierge system delivers items from retailers to customers. The online concierge predicts a range of times during which an order may be fulfilled for presentation to a user. The online concierge system uses a trained maximum time prediction model to determine a maximum time for order fulfillment based on an order. A trained minimum time prediction model determines a minimum time for order fulfillment from the order and the maximum time. The minimum time may account for one or more rules (e.g., a percentage of orders fulfilled before the minimum time, a desired rate of selection of a range including the minimum time). A range bounded by the maximum time and the minimum time is transmitted to a customer to enable the customer to select a time interval for order fulfillment.

20 Claims, 5 Drawing Sheets

GENERATING A RANGE OF ESTIMATED FULFILLMENT TIMES FOR AN ORDER BASED ON CHARACTERISTICS OF AN ORDER

BACKGROUND

Online concierge systems receive orders from a customer and identify the orders to pickers (or "shoppers"). An online concierge system allows a picker to select an order and to fulfill the order at a retailer. To receive an order, an online concierge system provides an interface identifying items offered by a retailer to a customer and receives selections of one or more items for an order from the customer. When providing an order to an online concierge system, a customer also identifies a time for the order to be fulfilled. For example, a customer selects a time window during which the order is to be fulfilled and identifies the selected time window to the online concierge system.

Conventional online concierge systems maintain discrete time windows during which orders are fulfilled, and a customer selects a specific time window for an order to be fulfilled. For example, a customer selects a time window corresponding to a specific range of times to schedule an order for fulfillment in the future or selects a time window that is an amount of time from a time when the order received, with the latter option allowing indicating the order is to be fulfilled as soon as possible. This allows customers of an online concierge system to select a specific time window for receiving items from an order.

Further, an online concierge system may allow a customer to specify fulfillment of an order within a time interval of a time when the online concierge system received the order. The online system may determine an estimated time by which the order is fulfilled based on an estimated time interval to fulfill the order and provide a customer with an option for the order to be fulfilled by the estimated time. Such a specification allows the user to select that the online concierge system fulfill the order as soon as possible. Conventionally, an online concierge system identifies the estimated time by which the order is fulfilled to the customer, allowing the customer to determine whether to select the order for fulfillment as soon as possible based on the estimated time identified by the online concierge system.

However, when determining the estimated time for fulfillment of an order, online concierge systems minimize the likelihood of orders being fulfilled later than the estimated time. This results in the online concierge system fulfilling most orders before the estimated time. However, conventional online concierge systems identify the estimated time, providing customers with no indication of the potential for order fulfillment earlier than the estimated time displayed by the online concierge system. As the estimated time is the latest time by which the order is fulfilled, conventional online concierge systems provide limited information about potential order fulfillment times to customers. As customers are unaware of possible times earlier than the estimated time by which an order may be fulfilled, the online concierge system decreases a likelihood of a customer selecting fulfillment of an order by the estimated time. This affects the online concierge system's ability to allocate pickers to different time intervals. Moreover, designing and implementing an online concierge system to overcome these issues is particularly challenging, especially when attempting to optimize the online concierge system's consumption of computing resources such as processing power and network bandwidth.

SUMMARY

In accordance with one or more aspects of the disclosure, an online concierge system receives an order from a customer at a time. The order includes one or more items and identifies a retailer from which the one or more items are obtained, as well as a location where a picker delivers the one or more items. After receiving the items included in the order, the online concierge system prompts the customer to select a time interval for fulfilling the order. In various embodiments, the online concierge system identifies different time intervals to the customer, with the customer selecting a time interval. The online concierge system allows the user to select that the order be fulfilled as soon as possible.

To provide the customer with information about fulfillment of the order as soon as possible, which allows the customer to more accurately determine whether to select fulfillment of the order as soon as possible, the online concierge system applies a trained maximum time prediction model to characteristics of the order. The maximum time prediction model outputs a maximum time by which the order is fulfilled (i.e., when the customer receives the items included in the order) based on characteristics of the order. Example characteristics of the order include: a location where the order is to be delivered, items included in the order, a number of items included in the order, a value of the order, a retailer identified by the order, a location of the retailer, a time when the order was received, categories of items included in the order, a geographic region including the location where the order is to be delivered, a geographic region including the location of the retailer, and other information describing the order. The maximum time prediction model is trained based on training examples generated from previously fulfilled orders in various embodiments.

While the maximum time provides a latest time by which the order is fulfilled, to indicate to the user that the order may be fulfilled before the maximum time, the online concierge system applies a trained minimum time prediction model to the characteristics of the order and the maximum time. The minimum time prediction model outputs a minimum time by which the order is fulfilled based on the characteristics of the order and the maximum time from the maximum time prediction model. In various embodiments, the minimum time prediction model accounts for one or more rules when determining the minimum time. The one or more rules may affect how the minimum time prediction model is trained or may affect an output the online concierge system selects from the minimum time prediction model. For example, a rule specifies a target percentage of orders fulfilled before the minimum time. As another example, a rule specifies a desired percentage or a desired rate for customers to select order fulfillment including the minimum time. Other rules may be applied by the online concierge system when training the minimum time prediction model or when selecting an output of the minimum time prediction model.

From the maximum time and the minimum time, the online concierge system generates a range of fulfillment times. The range of fulfillment times is bounded by the maximum time and the minimum time and specifies a time window during which the order is expected to be fulfilled. Including the maximum time and the minimum time in the range allows the online concierge system to provide a customer with more complete information about when the order may be fulfilled compared to identifying only the maximum time to the customer. The range allows the customer to account for fulfillment of a significant percentage of orders earlier than the maximum time, so the online concierge system provides the customer with increased information for selecting when the order is to be fulfilled.

In some embodiments, the online concierge system applies one or more display rules to the range when displaying the range to a customer. The display rules allow the online concierge system to modify how the range is displayed to the customer. For example, a display rule prevents display of the minimum time to the customer in response to the minimum time being less than a threshold amount of time from the time when the online concierge system received the order. Application of one or more display rules allows the online concierge system to increase or to decrease a likelihood of the customer selecting the range as the time window for fulfillment of the order.

Accurately estimating the delivery time range for each type of order can pose a technical challenge for a computing system, since there are many factors that can affect the estimated delivery time. To address this problem, one or more embodiments use machine learning models to predict the upper and lower ends of the delivery time range. The upper-end prediction is based on an existing trained model, while the lower-end prediction is generated by a new trained model that takes into account hyperparameters related to desired marketplace outcomes. Such a system may need to be able to process a large amount of data quickly to generate accurate delivery time estimates for each order, and it may also need to be able to adapt to changes in demand, inventory levels, and other factors that can affect delivery times. By providing customers with accurate delivery time estimates, the system helps to improve customer satisfaction and reduce the likelihood of late deliveries, which can lead to negative reviews and lost business. It also enables customers to make informed decisions about which delivery option to choose based on their needs and preferences.

DETAILED DESCRIPTION

Figure 1:
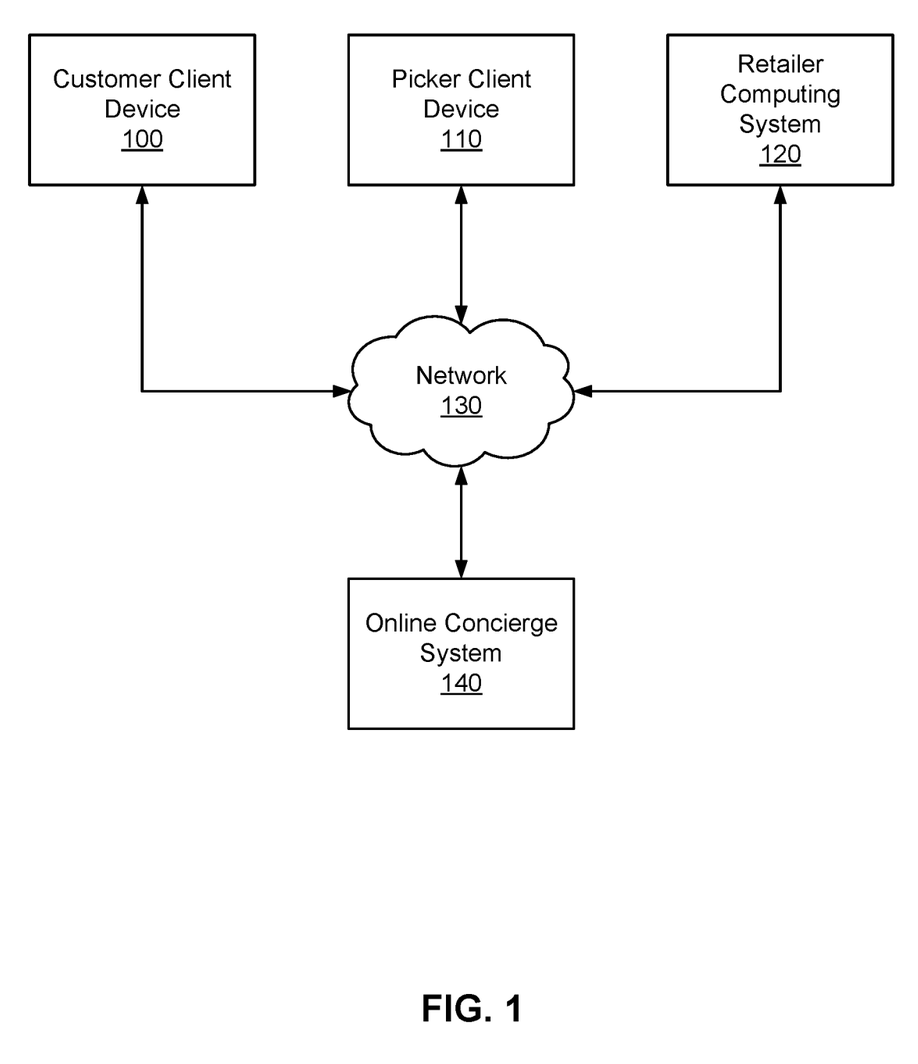
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while a single customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

In various embodiments, the ordering interface presented by the customer client device 100 includes an interface where the customer selects a time window or a time interval during which an order is to be fulfilled. For example, the interface is displayed to the customer after the customer has selected a retailer from which the order is fulfilled and selected items included in the order. As further described below in conjunction with FIGS. 3-5, in various embodiments, the interface includes one or more options for the order to be fulfilled as soon as possible, with an option for the order to be fulfilled as soon as possible displaying a range of fulfillment times determined by the online concierge system 140. The range of fulfillment times includes a minimum time by which the order is fulfilled and a maximum time by which the order is fulfilled, allowing the customer to account for an earliest time for order fulfillment and a latest time for order fulfillment when determining whether to select an option for the order to be fulfilled as soon as possible.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
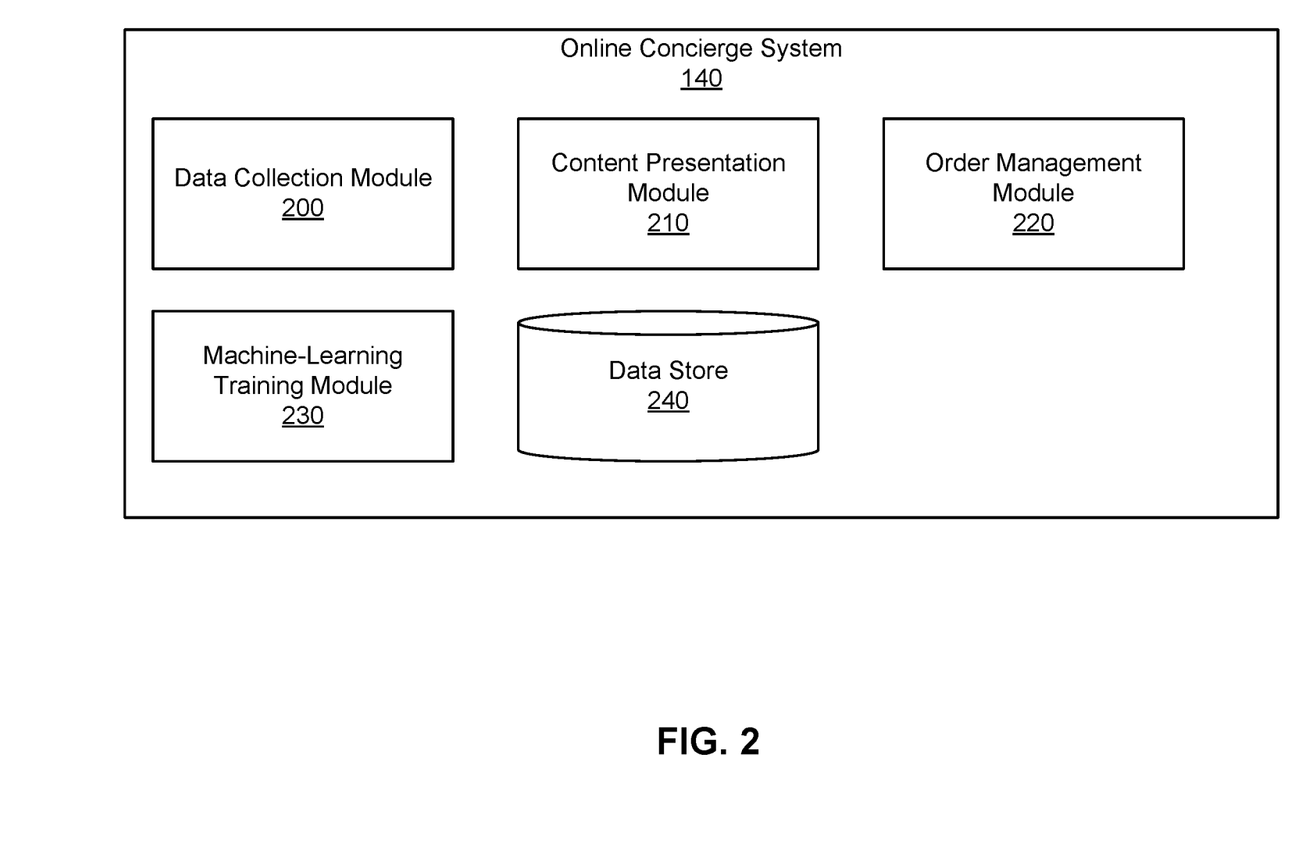
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

As further described below in conjunction with FIGS. 3-5, the machine learning training module 230 trains and stores a maximum time prediction model that generates and outputs a maximum time by which an order is fulfilled based on characteristics of the order. Similarly, the machine learning training module 230 trains and stores a minimum time prediction model that generates and outputs a minimum time by which an order is fulfilled. In generating the minimum time, the minimum time prediction model accounts for characteristics of the order, the maximum time by which the order is fulfilled from the maximum time prediction model, and may account for one or more rules maintained by the machine learning training module, as further described below in conjunction with FIG. 3. Application of the maximum time prediction model and the minimum time prediction model to an order allows the online concierge system 140 to generate a range of potential fulfillment times for an order, with the range displayed by the online concierge system 140 to a customer placing the order to provide the customer with additional information about potential fulfillment of the order when determining a time interval for order fulfillment.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
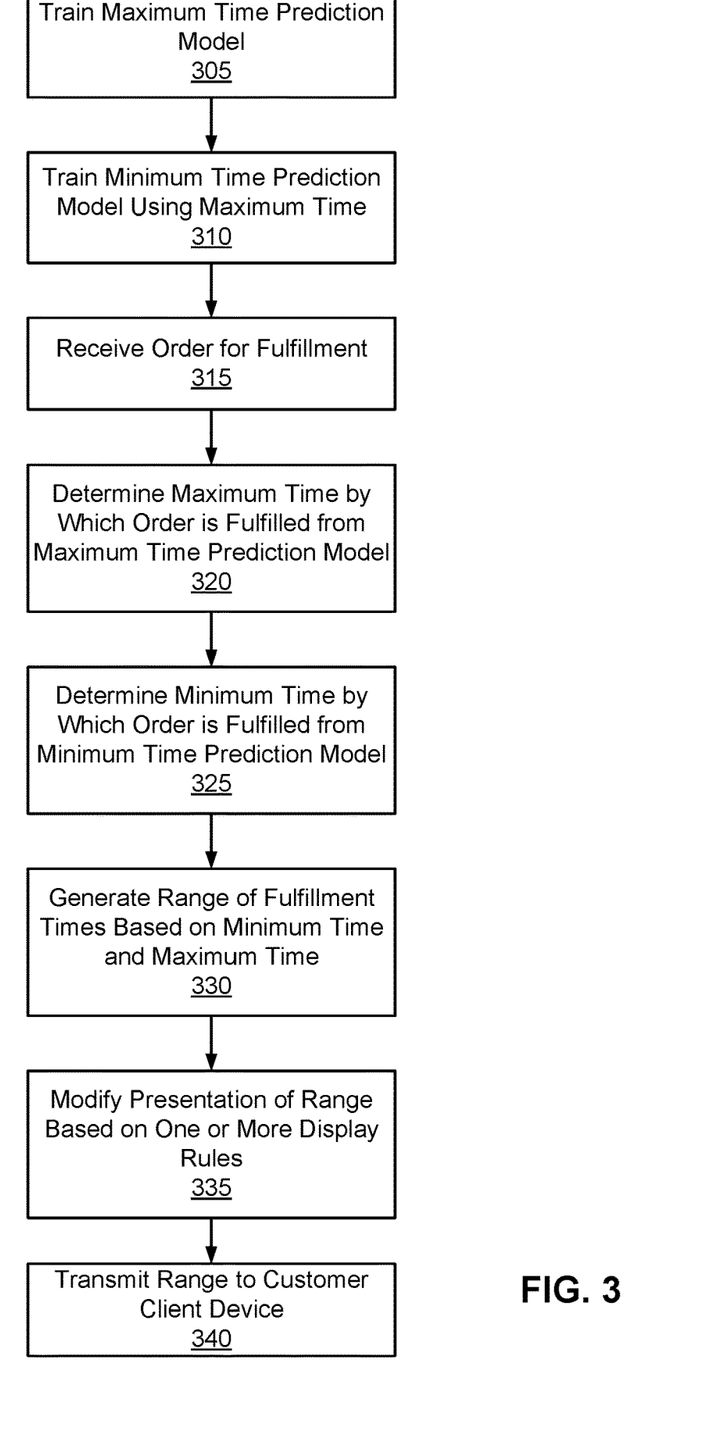
FIG. 3 is a flowchart of a method for determining a range of times for fulfilling an order, in accordance with one or more embodiments.

FIG. 3 is a flowchart of a method for determining a range of times for fulfilling an order, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

To provide a customer with information about potential fulfillment times for an order, the online concierge system 140 trains 305 a maximum time prediction model to predict a maximum time by which the order is fulfilled. The maximum time identifies the latest time by which the order is predicted to be fulfilled. To train 305 the maximum time prediction model, the online concierge system 140 retrieves historical data describing characteristics of previously fulfilled orders. Example characteristics of a previously fulfilled order include: information identifying a location to which the previously fulfilled order was delivered, items included in the previously fulfilled order, a number of items included in the previously fulfilled order, a value of the previously fulfilled order, a retailer from which the items of the previously fulfilled order were obtained, a distance traveled by a shopper to deliver items from the retailer to the location identified by the previously fulfilled order, a time when the online concierge system 140 received the previously fulfilled order, and a time when the previously fulfilled order was fulfilled. From the historical data describing previously fulfilled orders, the online concierge system 140 generates training examples used to train 305 the maximum time prediction model to determine the maximum amount of time for fulfilling an order. The maximum time prediction model receives an order as an input and outputs the maximum amount of time for fulfilling the order.

The maximum time prediction model comprises a set of weights stored on a non-transitory computer readable storage medium in various embodiments. For training, the online concierge system 140 initializes a network of a plurality of layers comprising the maximum time prediction model, with each layer including one or more weights. The maximum time prediction model is configured to receive an order as an input and a time when the order was received. Based on characteristics of the order and the time when the order was received, the maximum time prediction model generates an estimated maximum time for fulfilling the order. The weights comprise a set of parameters used by the desirability model to transform input data—the order and the time when the order was received—received by the model into output data—the maximum time by which the order may be fulfilled. Thus, the maximum time specifies a latest time by which the order is predicted by the online concierge system 140 to be fulfilled.

The online concierge system 140 system generates the parameters (e.g., the weights) for the maximum time prediction model through training, where the maximum time prediction model is applied to training examples from the historical data describing orders previously fulfilled by the online concierge system 140 after the set of weights comprising the model are initialized. Each training example includes a previously fulfilled order, including a time when the previously fulfilled order was received, with a label applied to a training example indicating a time when the previously fulfilled order was fulfilled or an amount of time taken to fulfill the previously fulfilled order included in the training example. Application of the maximum time prediction model to a training example generates a predicted maximum time when the order is fulfilled based on characteristics of the order included in the training example. As further described above, example characteristics of an order include: a location to which the previously fulfilled order was delivered, items included in the previously fulfilled order, a number of items included in the previously fulfilled order, a value of the previously fulfilled order, a retailer from which the items of the previously fulfilled order were obtained, a distance traveled by a picker to deliver items from the retailer to the location identified by the previously fulfilled order, a time when the online concierge system 140 received the previously fulfilled order, and a time when the previously fulfilled order was fulfilled. However, other characteristics of an order may be included in a training example in various embodiments. In various embodiments, the maximum time prediction model determines a maximum amount of time to fulfill an order and determines the maximum time by which the order may be fulfilled by incrementing the time when the order was received by the maximum amount of time.

For each training example of the training dataset to which the maximum time prediction model is applied, the online concierge system 140 generates an error term based on a predicted time when the order included in the training example is fulfilled and a label associated with the training example. The error term is larger when a difference between the predicted time when the order is fulfilled and the label applied to the training example is larger and is smaller when the difference between the predicted time when the order is fulfilled and the label applied to the training example is smaller. In various embodiments, the online concierge system 140 generates the error term between the predicted time when the order is fulfilled and the label applied to the training example using a loss function. Example loss functions include a mean square error function, a mean absolute error, a hinge loss function, and a cross-entropy loss function.

The online concierge system 140 backpropagates the error term to update the set of parameters comprising the maximum time prediction model and stops backpropagation in response to the error term, or the loss function, satisfying one or more criteria. For example, the online concierge system 140 backpropagates the error term through the model to update parameters of the model until the error term has less than a threshold value. For example, the online concierge system 140 may apply gradient descent to update the set of parameters. The online concierge system 140 stores the set of parameters comprising the model on a non-transitory computer readable storage medium after stopping the backpropagation for subsequent use of the maximum time prediction model to determine the maximum time for fulfilling the order based on characteristics of the order. For example, the online concierge system 140 applies the trained maximum time prediction model to an order received from a customer and determines the maximum time when the order may be fulfilled based on characteristics of the order.

While the trained maximum time prediction model allows the online concierge system 140 to determine a maximum time for fulfilling an order, many orders are fulfilled before the maximum time. For example, training 305 the maximum time prediction model is subject to a target percentage or a maximum percentage of orders permitted to be fulfilled later than the maximum time output by the maximum time prediction model. The target percentage is specified by the online concierge system 140 and used as a hyperparameter when training 305 the maximum time prediction model to minimize a number of orders fulfilled later than the maximum time. The constraint on a percentage of orders fulfilled later than the maximum time output by the maximum time prediction model causes a majority of orders to be fulfilled earlier than the maximum time.

Accounting for fulfillment of orders before the maximum time allows the online concierge system 140 to provide additional information to a customer when selecting a time interval during which an order is fulfilled. Providing the additional information to the customer may influence the time interval the customer selects for order fulfillment. For example, providing a customer with information about one or more times earlier than the maximum time that an order may be fulfilled when selected for fulfillment as soon as possible increases (or decreases) a likelihood of the customer for selecting the order for fulfillment as soon as possible from a time when the online concierge system 140 receives the order. Because of the influence on selection of a time interval by a user, accounting for characteristics of the order when determining one or more times earlier than the maximum time allows the online concierge system 140 to provide more accurate times for order fulfillment that the customer may evaluate.

To augment the maximum time by which the order may be fulfilled with information about earlier times by which the order may be fulfilled, the online concierge system 140 also trains 310 a minimum time prediction model to output a minimum time by which the order is fulfilled based on characteristics of the order and the maximum time by which the order may be fulfilled. The minimum time by which the order may be fulfilled identifies an earliest time by which the order is fulfilled. In various embodiments, the minimum time prediction model determines the minimum time when an order is fulfilled based on a maximum time when the order is fulfilled determined by the maximum time prediction model and based on characteristics of the order. This allows the online concierge system 140 to maintain separate models for determining the maximum time by which the order may be fulfilled and for determining the minimum time by which the order may be fulfilled. Maintaining separate models allows the online concierge system 140 to differently train the maximum time prediction model and the minimum time prediction model, so each model may be subject to different parameters during training or may differently weight characteristics of the order.

The online concierge system 140 trains the minimum time prediction model by initializing a network of a plurality of layers comprising the minimum time prediction model, with each layer including one or more weights. The minimum time prediction model is configured to receive an order and a maximum time by which the order may be fulfilled as input and to generate a minimum time for fulfilling the order. The weights comprise a set of parameters used by the minimum time model to transform input data (e.g., the order and the maximum time by which the order may be fulfilled) received by the minimum time model into output data (e.g., the minimum time by which the order may be fulfilled).

The online concierge system 140 system generates the parameters (e.g., the weights) for the minimum time prediction model through training, where the minimum time prediction model is applied to training examples from the historical data describing fulfilled orders previously received by the online concierge system 140 after the set of weights comprising the model are first initialized. Each training example includes a previously fulfilled order and a maximum time by which the previously fulfilled order was fulfilled (e.g., from application of the maximum time prediction model to the previously fulfilled order) with a label applied to a training example indicating a minimum time by which previously fulfilled order included in the training example could have been fulfilled or a minimum amount of time for fulfilling the previously fulfilled order. Application of the minimum time prediction model to a training example generates a predicted minimum time when the order may be fulfilled based on characteristics of the order included in the training example. As further described above, example characteristics of an order include: a location to which the previously fulfilled order was delivered, items included in the previously fulfilled order, a number of items included in the previously fulfilled order, a value of the previously fulfilled order, a retailer from which the items of the previously fulfilled order were obtained, a distance traveled by a picker to deliver items from the retailer to the location identified by the previously fulfilled order, a time when the online concierge system 140 received the previously fulfilled order, and a time when the previously fulfilled order was fulfilled. However, other characteristics of an order may be included in a training example in various embodiments.

For each training example of the training dataset to which the minimum time prediction model is applied, the online concierge system 140 generates an error term based on a predicted time when the order included in the training example is fulfilled output by the minimum time prediction model and a label associated with the training example. The error term is larger when a difference between the predicted time when the order is fulfilled and the label applied to the training example is larger and is smaller when the difference between the predicted time when the order is fulfilled and the label applied to the training example is smaller. In various embodiments, the online concierge system 140 generates the error term between the predicted time when the order is fulfilled and the label applied to the training example using a loss function. Example loss functions include a mean square error function, a mean absolute error, a hinge loss function, and a cross-entropy loss function.

The online concierge system 140 backpropagates the error term to update the set of parameters comprising the maximum time prediction model and stops backpropagation in response to the error term, or the loss function, satisfying one or more criteria. For example, the online concierge system 140 backpropagates the error term through the model to update parameters of the model until the error term has less than a threshold value. For example, the online concierge system 140 may apply gradient descent to update the set of parameters. The online concierge system 140 stores the set of parameters comprising the minimum time prediction model on a non-transitory computer readable storage medium after stopping the backpropagation for subsequent use to determine the minimum time for fulfilling the order based on characteristics of the order and the maximum time by which the order may be fulfilled. For example, the online concierge system 140 applies the trained minimum time prediction model to a combination of an order received from a customer and a maximum time by which the order may be fulfilled from the maximum time prediction model and determines the minimum time when the order may be fulfilled based on characteristics of the order and the maximum time for the order.

When training the minimum time prediction model, the online concierge system 140 accounts for one or more rules specifying hyperparameters when updating the set of parameters. The one or more hyperparameters affecting amounts by which one or more parameters of the minimum time prediction model are updated during backpropagation. For example, a rule includes a hyperparameter specifying a target percentage of orders fulfilled earlier than the minimum time determined by the minimum time prediction model. Adjusting the target percentage of orders fulfilled earlier than the minimum time affects modification of one or more parameters to increase the minimum time when the target percentage of orders fulfilled earlier than the minimum time is higher or to decrease the minimum time when the target percentage of orders fulfilled earlier than the minimum time is lower. As another example, a rule includes a hyperparameter specifying a desired rate or a desired percentage of customers selecting fulfillment of an order with a minimum time output by the minimum time prediction model. For example, having a lower minimum time output by the minimum time prediction model increases a likelihood of a customer selecting order fulfillment during a time interval based on the minimum time, so increasing a hyperparameter specifying desired rate or a desired percentage of customer selection hyperparameter adjusts modification of one or more parameters of the minimum time prediction model to decrease the minimum time that is output.

In various embodiments, the online concierge system 140 allows a user to select between priority fulfillment of an order and standard fulfillment of the order. While standard fulfillment of an order allows the customer to select the order for fulfillment as soon as possible, priority fulfillment of the order allows the customer to select the order for fulfillment as soon as possible with a picker further expediting fulfillment of the order. When priority fulfillment and standard fulfillment are offered for orders, the online concierge system 140 may determine a minimum time for standard fulfillment of an order using the minimum time prediction model and determine a minimum time for priority fulfillment of the order using the minimum time prediction model applied to the order with one or more characteristics indicating priority fulfillment of the order. In such embodiments, a rule may specify a desired ratio of selection of priority fulfillment of orders to selection of standard fulfillment of orders, with the ratio affecting modification of one or more weights that account for one or more characteristics of an order indicating priority fulfillment of the order to adjust the minimum time for standard fulfillment of the order or the minimum time for priority fulfillment of the order to maintain the desired ratio.

After training 305 the maximum time prediction model and training 310 the minimum time prediction model, the online concierge system 140 receives 315 an order from a customer. The order includes one or more items, a location where items of the order are to be delivered, as well as other information. Based on application of the maximum time prediction model to characteristics of the order and to the time when the online concierge system 140 received 315 the order, the online concierge system 140 determines 320 a maximum time by which the order may be fulfilled. Additionally, the online concierge system 140 determines 325 a minimum time by which the order may be fulfilled by applying the minimum time prediction model to characteristics of the order and to the maximum time by which the order may be fulfilled. Hence, the minimum time and the maximum time form a range of times during which the online concierge system 140 predicted the order to be fulfilled.

In various embodiments, the online concierge system 140 determines 325 the minimum time by applying one or more variations of the minimum time prediction model to the maximum time by which the order is fulfilled and the order, which generates a set of candidate minimum times. For example, the online concierge system 140 trains 310 and maintains multiple variants of the minimum time prediction model, with different variants trained 310 subject to hyperparameters specified by different rules. For example, a first variant of the minimum time prediction module was trained 310 using a hyperparameter specifying a target percentage of orders fulfilled earlier than the minimum time form the minimum time prediction model, while a second variant of the minimum time prediction model was trained using a different hyperparameter specifying an alternative target percentage of orders fulfilled earlier than the minimum time. Similarly, other variants of the minimum time prediction model may be trained according to other rules, allowing the online concierge system 140 to maintain different variants of the minimum time prediction model that are based on different hyperparameters. In some embodiments, the online concierge system 140 applies multiple variants of the minimum time prediction model to the order and to the maximum time by which the order is fulfilled, determining multiple candidate minimum times by which the order may fulfilled that each correspond to a minimum time prediction model trained using one or more different hyperparameters.

The online concierge system 140 selects a candidate minimum time according to one or more selection rules and determines 325 the minimum time by which the order may be fulfilled as the selected candidate minimum time. In various embodiments, the online concierge system 140 maintains one or more selection rules for selecting a candidate minimum time. For example, a selection rule specifies a target percentage of orders fulfilled earlier than the minimum time, so the online concierge system 140 selects a candidate minimum time determined 325 from a variant of the minimum time prediction model trained 310 subject to a rule including the specified target percentage of orders fulfilled earlier than the minimum time. As another example, a selection rule specifies a desired rate or a desired percentage of customers selecting fulfillment of an order and selects a candidate minimum time output by a variant of the minimum time prediction model trained 310 based on a rule including the desired rate or the desired percentage.

As further described above, in various embodiments, the online concierge system 140 allows a user to select between priority fulfillment of the order and standard fulfillment of the order. When the online concierge system 140 provides for priority fulfillment of an order and standard fulfillment of the order, the online concierge system 140 determines 320 a maximum time for priority fulfillment of the order and determines 325 a minimum time for priority fulfillment of the order. Additionally, the online concierge system 140 determines 320 a maximum time for standard fulfillment of the order and determines 325 a minimum time for standard fulfillment of the order. In various embodiments, to determine 320 the maximum time for priority fulfillment of the order and to determine 325 the minimum time for priority fulfillment of the order, the online concierge system 140 modifies one or more characteristics of the order relative to characteristics of the order used to determine 320 the maximum time for standard fulfillment of the order and to determine 325 the minimum time for standard fulfillment of the order. The one or more characteristics of the order modified by the online concierge system 140 to indicate priority fulfillment of the order in various embodiments.

In some embodiments, the online concierge system 140 maintains a selection rule specifying a target ratio of orders selecting standard fulfillment to orders selecting priority fulfillment. The online concierge system 140 determines 325 a minimum time for priority fulfillment of the order and determines 325 a minimum time for standard fulfillment of the order to satisfy the target ratio of orders, or to be within a threshold amount of the target ratio, in various embodiments. In various embodiments, the online concierge system 140 selects a candidate minimum time for priority fulfillment of the order and a candidate minimum time for standard fulfillment of the order satisfying the selection rule specifying the target ratio from different candidate minimum times for priority fulfillment and from different candidate minimum times for standard fulfillment, as further described above.

The online concierge system 140 generates 330 a range of fulfillment times for the order based on the maximum time by which the order may be fulfilled and the minimum time by which the order may be fulfilled. The range includes times between the minimum time and the maximum time, allowing the online concierge system 140 indicate to a customer that the order is predicted to be fulfilled between the minimum time and the maximum time. When the online concierge system 140 allows the user to select between priority fulfillment of the order and standard fulfillment of the order, the online concierge system 140 generates 330 a priority range for priority fulfillment of the order between the minimum time for priority fulfillment of the order and the maximum time for priority fulfillment of the order and generates 330 a standard range for standard fulfillment of the order between the minimum time for standard fulfillment of the order and the maximum time for standard fulfillment of the order.

In some embodiments, the online concierge system 140 modifies 335 presentation of the range of display times based on one or more display rules maintained by the online concierge system 140. The display rules allow the online concierge system 140 to alter how the range of times is displayed to the customer. For example, when the online concierge system 140 offers priority fulfillment and standard fulfillment of an order, the online concierge system 140 applies one or more display rules to the priority range and to the standard range, allowing the online concierge system 140 to modify how the priority range or the standard range is displayed to the customer. For example, a display rule prevents display of a minimum time for standard fulfillment of the order in response to the minimum time for standard fulfillment of the order being less than the minimum time for priority fulfillment of the order. In the preceding example, the display rule allows the online concierge system 140 to increase a likelihood of the customer selecting priority fulfillment of the order by withholding display of a minimum time for standard fulfillment of the order that is sooner than the minimum time for priority fulfillment of the order.

As another example, a display rule withholds display of a minimum time (for priority fulfillment or for standard fulfillment) in response to the minimum time being less than a threshold amount of time from a time when the online concierge system 140 received 315 the order. In some embodiments, the online concierge system 140 maintains display rules specifying different threshold amounts of time from the time when the online concierge system 140 for orders having different characteristics and determines the threshold amount of time based on one or more characteristics of the order (e.g., items included in the order, a flag included in the order by the customer). Hence, the online concierge system 140 withholds display of the minimum time for fulfillment of the order in response to the minimum time being less than the threshold amount of time from the time when the online concierge system 140 received 315 the order. The online concierge system 140 may maintain different threshold amounts of time for priority fulfillment of orders and for standard fulfillment of orders in some embodiments.

The online concierge system 140 transmits 340 the range of fulfillment times, which may be modified 335 based on the one or more display rules, to a customer client device 100. The customer client device 100 displays the determined range of fulfillment times to the customer in an interface. When the range of fulfillment times is modified based on one or more display rules, the modified range is transmitted 340 to the customer client device 100 for display, allowing the display rules to customize information about the range of fulfillment times displayed by the customer client device 100. In various embodiments, the online concierge system 140 transmits 340 a range of fulfillment times determined 330 for priority fulfillment of the order and transmits 340 a different range of fulfillment times determines 330 for standard fulfillment of the order.

Figure 4:
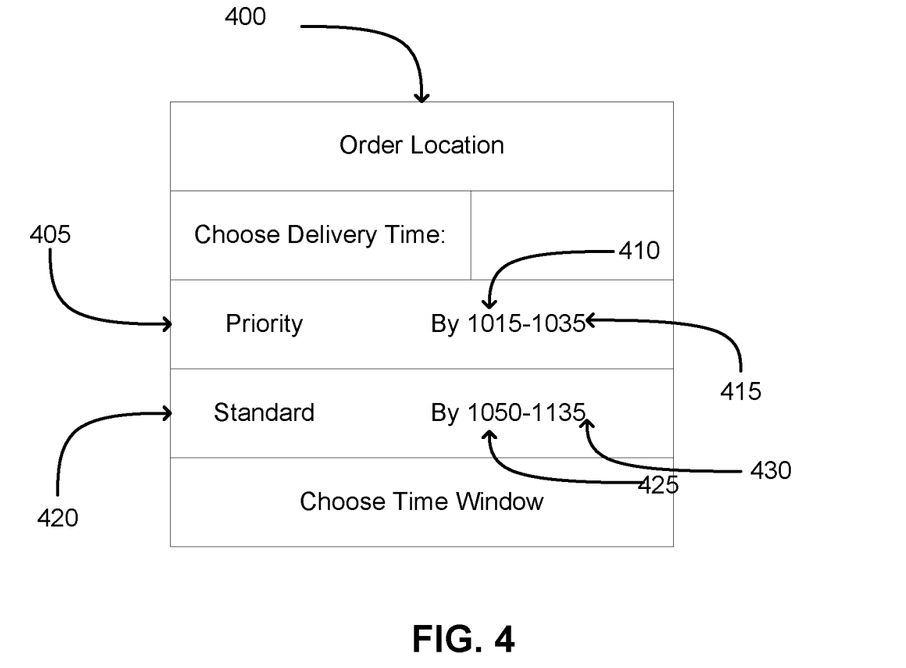
FIG. 4 is an example interface presenting one or more ranges of times for fulfilling an order, in accordance with one or more embodiments.

FIG. 4 shows an example interface 400 displayed by a customer client device 100 identifying a range of fulfillment times for an order. In the example shown by FIG. 4, the interface 400 displays multiple time intervals for fulfilling an order received by the online concierge system 140, allowing the customer who provided the order to select when the order is to be fulfilled. For purposes of illustration, the example interface 400 in FIG. 4 includes a priority fulfillment option 405 displaying a priority fulfillment range including a minimum time 410 for priority fulfillment of the order and a maximum time 415 for priority fulfillment of the order, each determined as further described above in conjunction with FIG. 3.

Additionally, the interface 400 in FIG. 4 includes a standard fulfillment option 420 displaying a standard fulfillment range including a minimum time 425 for standard fulfillment of the order and a maximum time 430 for standard fulfillment of the order, each determined as further described above in conjunction with FIG. 3. In various embodiments, the online concierge system 140 changes one or more characteristics of the order when determining the minimum time 410 for priority fulfillment and the maximum time 415 for priority fulfillment relative to characteristics of the order when determining the minimum time 425 for standard fulfillment and the maximum time 430 for standard fulfillment. The changed one or more characteristics cause the minimum time 425 for standard fulfillment of the order to differ from the minimum time 410 for priority fulfillment of the order and causing the maximum time 430 for standard fulfillment of the order to differ from the maximum time 415 for priority fulfillment of the order.

In various embodiments, the online concierge system 140 applies one or more display rules modifying how the priority fulfillment range is displayed in the interface or modifying how the standard fulfillment range is displayed. For example, a display rule withholds presentation of the minimum time 425 for standard fulfillment in response to the minimum time 425 for standard fulfillment of the order being less than the minimum time 410 for priority fulfillment of the order (i.e., the minimum time 425 for standard fulfillment is sooner than the minimum time 410 for priority fulfillment). In the preceding example, the priority fulfillment option 405 displays the minimum time 410 for priority fulfillment of the order and the maximum time 415 for priority fulfillment of the order, while the standard fulfillment option 420 displays the maximum time 430 for standard fulfillment of the order and does not display the minimum time 425 for standard fulfillment of the order.

As another example, a display rule prevents display of the minimum time 410 for priority fulfillment of the order in response to the minimum time 410 for priority fulfillment being less than a threshold amount of time from a time when the online concierge system 140 received the order. For example, the threshold amount of time is 20 minutes from the time when the online concierge system 140 received the order, so the priority fulfillment option 405 does not display a minimum time 410 for priority fulfillment of the order that is less than 20 minutes from the time when the online concierge system 140 received the order. In various embodiments, the online concierge system 140 maintains a similar display rule that prevents display of the minimum time 425 for standard fulfillment of the order based on a threshold amount of time from the time when the online concierge system 140 received the order. Further, in some embodiments, different display rules maintain different threshold amounts of time that correspond to different characteristics of orders.

Application of one or more display rules allows the online concierge system 140 to modify presentation of the priority fulfillment range or the standard fulfillment range by the interface 400. This allows the display rules to affect a customer's likelihood of selecting the priority fulfillment option 405 or of selecting the standard fulfillment option 420 by adjusting data included in the interface 400 about the priority fulfillment range or about the standard fulfillment range. In various embodiments, the online concierge system 140 applies different display rules at different times, allowing the data included in the interface 400 to be modified at different times.

Based on an input received from the customer, the online concierge system 140 receives a selection of a time interval for fulfillment of the order. For example, an interaction with the priority fulfillment option 405 selects the priority fulfillment range for the order, while an interaction with the standard fulfillment option 420 selects the standard fulfillment range for the order. The online concierge system 140 stores the selected time interval in association with the order for identification to a picker selecting the order for fulfillment. Hence, the minimum time by which the order may be fulfilled and the maximum time by which the order may be fulfilled allow the online concierge system 140 to identify a range of fulfillment times for the order to a customer accounting for characteristics of the orders. This provides a customer with an accurate indication of a range of times when the order may be fulfilled, allowing the customer to better select a time interval for order fulfillment based on the user's time constraints or preferences.

Figure 5:
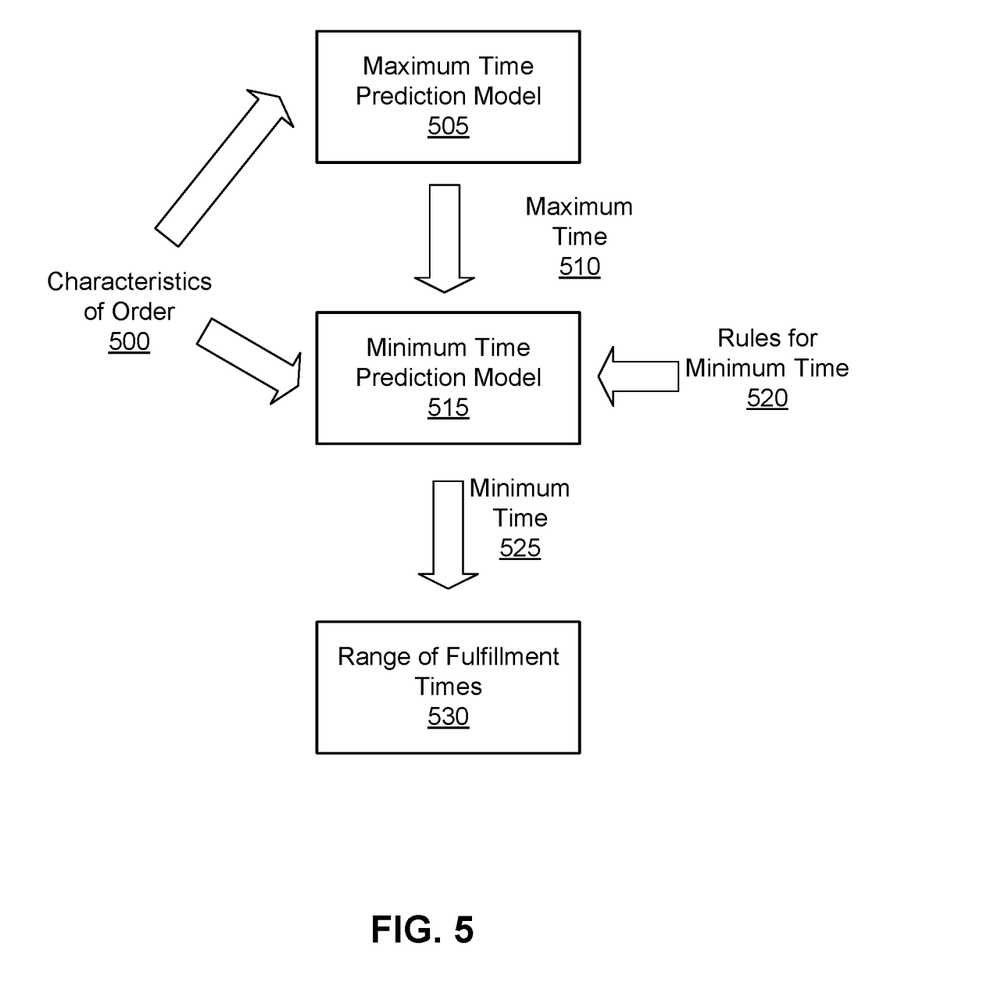
FIG. 5 is a process flow diagram of a method for determining a range of times for fulfilling an order, in accordance with one or more embodiments.

FIG. 5 is a process flow diagram of a method for determining a range of times for fulfilling an order, in accordance with some embodiments. An online concierge system 140 receives an order from a customer at a time. For example, an online concierge system 140 receives an order from the customer from a customer client device 100. As further described above in conjunction with FIGS. 2 and 3, the order includes one or more items and identifies a retailer from which the one or more items are obtained, as well as a location where a picker delivers the one or more items.

The online concierge system 140 applies a trained maximum time prediction model 505 to the characteristics 500 of the order, with the maximum time prediction model 505 outputting a maximum time 510 by which the order may be fulfilled (i.e., when the customer receives the items included in the order) based on the characteristics 500 of the order. Example characteristics 500 of the order include: a location where the order is to be delivered, items included in the order, a number of items included in the order, a value of the order, a retailer identified by the order, a location of the retailer, a time when the order was received, categories of items included in the order, a geographic region including the location where the order is to be delivered, a geographic region including the location of the retailer, and other information describing the order. The maximum time prediction model 505 is trained to output the maximum time 510 based on the characteristics 500 of the order, as further described above in conjunction with FIG. 3.

To account for orders being fulfilled earlier than the maximum time 510, the online concierge system 140 applies a trained minimum time prediction model 515 to the characteristics 500 of the order and to the maximum time 510, resulting in a minimum time 525 by which the order may be fulfilled. In various embodiments, the minimum time prediction model 515 accounts for one or more rules 520 when determining the minimum time 525. The one or more rules 520 may affect how the minimum time prediction model 515 is trained or may affect an output from the minimum time prediction model 515. For example, a rule specifies a target percentage of orders fulfilled before the minimum time 525. As another example, a rule specifies a desired percentage or a desired rate for customers to select order fulfillment including the minimum time 525. Other rules may be applied by the online concierge system 140 when training the minimum time prediction model 515.

From the maximum time 510 and the minimum time 525, the online concierge system 140 generates a range 530 of fulfillment times that is bounded by the maximum time 510 and the minimum time 525. Hence, the range 530 and specifies a time window during which the online concierge system 140 expects the order to be fulfilled. Including the maximum time 510 and the minimum time 525 in the range 530 provides the customer from whom the order was received with more complete information about when the order may be fulfilled compared to identifying only the maximum time 510 to the customer. Additionally, as the maximum time 510 and the minimum time 525 are determined from application of trained models to the order, the maximum time 510 and the minimum time 525 more accurately reflect likely fulfillment times from order-specific characteristics relative to decrementing the maximum time 510 by a fixed amount or by increasing the minimum time 525 by a fixed amount. This improved accuracy increases a likelihood of the order being fulfilled within the range 530 by leveraging characteristics of the order. The range 530 allows the online concierge system 140 to account for fulfillment of orders earlier than the maximum time 510, which increases information available to a customer when selecting when the order is to be fulfilled.

Additional Considerations

The foregoing description of the embodiments has been presented for the purpose of illustration; many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at an online concierge system comprising a processor and a computer-readable medium:
   receiving, by the online concierge system, a current order at a time, the current order including one or more items;
   determining a maximum time by which the current order may be fulfilled by applying a trained maximum time prediction model to characteristics about the current order;
   accessing a minimum time prediction model that is trained by:
      generating a training dataset with information about a set of characteristics for a previously fulfilled order, a maximum time by which the previously fulfilled order could be fulfilled, and a label indicating a minimum amount of time for fulfilling the previously fulfilled order,
      applying the minimum time prediction model to the training dataset to predict a minimum time when the previously fulfilled order may be fulfilled,
      generating an error term based on the predicted minimum time and the label, and
      backpropagating the error term to the minimum time prediction model to update a set of parameters of the minimum time prediction model, wherein one or more hyperparameters affect amounts by which the set of parameters of the minimum time prediction model are updated during the backpropagation;
   determining a minimum time by which the current order may be fulfilled by applying the updated set of parameters of the minimum time prediction model to characteristics about the current order and to the maximum time determined by the maximum time prediction model;

determining a range of fulfillment times for the current order based on the determined maximum time and the determined minimum time; and transmitting the determined range of fulfillment times to a customer client device for display via an interface, wherein transmitting the determined range of fulfillment times to the customer client device causes the customer client device to present one or more graphical user interfaces comprising the determined range of fulfillment times.

2. The method of claim 1, wherein a hyperparameter of the one or more hyperparameters specifies a target percentage of orders fulfilled earlier than the determined minimum time.

3. The method of claim 1, wherein a hyperparameter of the one or more hyperparameters specifies a desired rate of selection of the range of fulfillment times including the determined minimum time.

4. The method of claim 1, wherein determining the maximum time by which the current order may be fulfilled based on application of the maximum time prediction model to the current order comprises:
  determining a maximum time for priority fulfillment of the current order; and
  determining a maximum time for standard fulfillment of the current order.

5. The method of claim 4, wherein determining the minimum time by which the current order may be fulfilled based on application of the minimum time prediction model to the current order and to the determined maximum time by which the current order may be fulfilled comprises:
  determining a minimum time for priority fulfillment of the current order; and
  determining a minimum time for standard fulfillment of the current order.

6. The method of claim 5, wherein determining the range of fulfillment times for the current order to display based on the determined maximum time and the determined minimum time comprises:
  determining a priority range of fulfillment times based on the minimum time for priority fulfillment of the current order and the maximum time for priority fulfillment of the current order; and
  determining a standard range of fulfillment times based on the minimum time for standard fulfillment of the current order and the maximum time for standard fulfillment of the current order.

7. The method of claim 6, wherein a hyperparameter of the one or more hyperparameters specifies a target ratio of selection of standard fulfillment to selection of priority fulfillment.

8. The method of claim 6, wherein transmitting the determined range of fulfillment times to the customer client device for display via the interface comprises:
  modifying the priority range of fulfillment times of the standard range of fulfillment times based on one or more display rules; and
  transmitting the priority range of fulfillment times and the standard range of fulfillment times to the customer client device after modifying.

9. The method of claim 8, wherein modifying the priority range of fulfillment times of the standard range of fulfillment times based on one or more display rules comprises:
  modifying the standard range of fulfillment times to include the maximum time for standard fulfillment and to not include the minimum time for standard fulfillment in response to the minimum time for standard fulfillment being less than the minimum time for priority fulfillment.

10. The method of claim 1, wherein transmitting the determined range of fulfillment times to the customer client device for display via the interface comprises:
  modifying the determined range of fulfillment times based on one or more display rules; and
  transmitting the determined range of fulfillment times to the customer client device after modifying the determined range of fulfillment times.

11. The method of claim 10, wherein modifying the determined range of fulfillment times based on one or more display rules comprises:
  removing the minimum time by which the current order is fulfilled from the determined range in response to the minimum time by which the current order is fulfilled being less than a threshold amount of time from the time when the current order was received.

12. A computer program product comprising a non-transitory computer readable storage medium having instructions encoded thereon that, when executed by a processor, cause the processor to perform steps including:
  receiving a current order at a time, the current order including one or more items;
  determining a maximum time by which the current order may be fulfilled by applying a trained maximum time prediction model to characteristics about the current order;
  accessing a minimum time prediction model that is trained by:
    generating a training dataset with information about a set of characteristics for a previously fulfilled order, a maximum time by which the previously fulfilled order could be fulfilled, and a label indicating a minimum amount of time for fulfilling the previously fulfilled order,
    applying the minimum time prediction model to the training dataset to predict a minimum time when the previously fulfilled order may be fulfilled,
    generating an error term based on the predicted minimum time and the label, and
    backpropagating the error term to the minimum time prediction model to update a set of parameters of the minimum time prediction model, wherein one or more hyperparameters affect amounts by which the set of parameters of the minimum time prediction model are updated during the backpropagation;
  determining a minimum time by which the current order may be fulfilled by applying the updated set of parameters of the minimum time prediction model to characteristics about the current order and to the maximum time determined by the maximum time prediction model;
  determining a range of fulfillment times for the current order based on the determined maximum time and the determined minimum time; and
  transmitting the determined range of fulfillment times to a customer client device for display via an interface, wherein transmitting the determined range of fulfillment times to the customer client device causes the customer client device to present one or more graphical user interfaces comprising the determined range of fulfillment times.

13. The computer program product of claim 12, wherein a hyperparameter of the one or more hyperparameters specifies a target percentage of orders fulfilled earlier than the determined minimum time.

14. The computer program product of claim 12, wherein a hyperparameter of the one or more hyperparameters specifies a desired rate of selection of the range of fulfillment times including the determined minimum time.

15. The computer program product of claim 12, wherein determining the maximum time by which the current order may be fulfilled based on application of the maximum time prediction model to the current order comprises:
   determining a maximum time for priority fulfillment of the current order; and
   determining a maximum time for standard fulfillment of the current order.

16. The computer program product of claim 15, wherein determining the minimum time by which the current order may be fulfilled based on application of the minimum time prediction model to the current order and to the determined maximum time by which the current order may be fulfilled comprises:
   determining a minimum time for priority fulfillment of the current order; and
   determining a minimum time for standard fulfillment of the current order.

17. The computer program product of claim 16, wherein a hyperparameter of the one or more hyperparameters specifies a target ratio of selection of standard fulfillment to selection of priority fulfillment.

18. The computer program product of claim 16, wherein transmitting the determined range of fulfillment times to the customer client device for display via the interface comprises:
   modifying the priority range of fulfillment times of the standard range of fulfillment times based on one or more display rules; and
   transmitting the priority range of fulfillment times and the standard range of fulfillment times to the customer client device after modifying.

19. The computer program product of claim 18, wherein modifying the priority range of fulfillment times of the standard range of fulfillment times based on one or more display rules comprises:
   modifying the standard range of fulfillment times to include the maximum time for standard fulfillment and to not include the minimum time for standard fulfillment in response to the minimum time for standard fulfillment being less than the minimum time for priority fulfillment.

20. A system comprising:
a processor; and
a non-transitory computer readable storage medium having instructions encoded thereon that, when executed by the processor, cause the processor to perform steps including:
   receiving a current order at a time, the current order including one or more items;
   determining a maximum time by which the current order may be fulfilled by applying a trained maximum time prediction model to characteristics about the current order;
   accessing a minimum time prediction model that is trained by:
      generating a training dataset with information about a set of characteristics for a previously fulfilled order, a maximum time by which the previously fulfilled order could be fulfilled, and a label indicating a minimum amount of time for fulfilling the previously fulfilled order,
      applying the minimum time prediction model to the training dataset to predict a minimum time when the previously fulfilled order may be fulfilled,
      generating an error term based on the predicted minimum time and the label, and
      backpropagating the error term to the minimum time prediction model to update a set of parameters of the minimum time prediction model, wherein one or more hyperparameters affect amounts by which the set of parameters of the minimum time prediction model are updated during the backpropagation;
   determining a minimum time by which the current order may be fulfilled by applying a trained the updated set of parameters of the minimum time prediction model to characteristics about the current order and to the maximum time determined by the maximum time prediction model;
   determining a range of fulfillment times for the current order based on the determined maximum time and the determined minimum time; and
   transmitting the determined range of fulfillment times to a customer client device for display via an interface, wherein transmitting the determined range of fulfillment times to the customer client device causes the customer client device to present one or more graphical user interfaces comprising the determined range of fulfillment times.

* * * * *